United States Patent
Wu

(10) Patent No.: US 9,867,061 B2
(45) Date of Patent: Jan. 9, 2018

(54) METHOD OF HANDLING MEASUREMENT PATTERN FOR TDD SYSTEM AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 110 days.

(21) Appl. No.: 14/493,326

(22) Filed: Sep. 22, 2014

(65) Prior Publication Data
US 2015/0085671 A1 Mar. 26, 2015

Related U.S. Application Data

(60) Provisional application No. 61/881,938, filed on Sep. 24, 2013.

(51) Int. Cl.
*H04W 24/02* (2009.01)
*H04L 5/14* (2006.01)
*H04L 5/00* (2006.01)

(52) U.S. Cl.
CPC ........... *H04W 24/02* (2013.01); *H04L 5/0092* (2013.01); *H04L 5/1438* (2013.01); *H04L 5/1469* (2013.01); *H04L 5/001* (2013.01); *H04L 5/0082* (2013.01)

(58) Field of Classification Search
CPC .... H04W 24/02; H04L 5/0092; H04L 5/1438; H04L 5/1469; H04L 5/001; H04L 5/0082
See application file for complete search history.

(56) References Cited

U.S. PATENT DOCUMENTS

| | | | | |
|---|---|---|---|---|
| 2012/0113844 A1* | 5/2012 | Krishnamurthy | ..... | H04L 1/0026 370/252 |
| 2012/0213137 A1* | 8/2012 | Jeong | ................ | H04W 52/0212 370/311 |
| 2013/0286906 A1* | 10/2013 | Seo | ................... | H04W 72/0426 370/280 |

(Continued)

FOREIGN PATENT DOCUMENTS

| CN | 102984767 A | 3/2013 |
|---|---|---|
| CN | 103201970 A | 7/2013 |
| WO | 2012115414 A2 | 8/2012 |

OTHER PUBLICATIONS

3GPP TS 36.331 V11.5.0 (Sep. 2013) Technical Specification 3rd Generation Partnership Project; Technical Specification Group Radio Access Network; Evolved Universal Terrestrial Radio Access (E-UTRA); Radio Resource Control (RRC); Protocol specification (Release 11).

(Continued)

*Primary Examiner* — Curtis A Alia
(74) *Attorney, Agent, or Firm* — Winston Hsu

(57) ABSTRACT

A method of handling a measurement pattern for a communication device comprises receiving a subframe pattern from a network; receiving an uplink/downlink (UL/DL) configuration from the network; and performing a communication operation in a subframe according to the subframe pattern and the UL/DL configuration; wherein the subframe pattern is applied to a plurality of UL/DL configurations, and the UL/DL configuration is one of the plurality of UL/DL configurations.

6 Claims, 6 Drawing Sheets

(56) References Cited

U.S. PATENT DOCUMENTS

2013/0336177 A1* 12/2013 Gao .................. H04W 72/0446
370/280
2014/0086112 A1* 3/2014 Stern-
Berkowitz ........ H04W 72/1289
370/280

OTHER PUBLICATIONS

3GPP TR 36.828 V11.0.0 (Jun. 2012) Technical Report 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11).
Office action dated Jun. 27, 2017 for the China application No. 201410493344.0, filing date Sep. 24, 2014, p. 1-5.

* cited by examiner

| UL/DL configuration | Subframe number 0 1 2 3 4 5 6 7 8 9 |
|---|---|
| 0 | D S U U U D S U U U |
| 1 | D S U U D D S U U D |
| 2 | D S U D D D S U D D |
| 3 | D S U U U D D D D D |
| 4 | D S U U D D D D D D |
| 5 | D S U D D D D D D D |
| 6 | D S U U U D S U U D |

FIG. 1 PRIOR ART

METHOD OF HANDLING MEASUREMENT PATTERN FOR TDD SYSTEM AND RELATED COMMUNICATION DEVICE

CROSS REFERENCE TO RELATED APPLICATIONS

This application claims the benefit of U.S. Provisional Application No. 61/881,938, filed on Sep. 24, 2013 and incorporated herein by reference.

BACKGROUND OF THE INVENTION

1. Field of the Invention

The present invention relates to a method used in a time-division duplexing (TDD) system and related communication device, and more particularly, to a method of handling a measurement pattern for the TDD system and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system operating in a frequency-division duplexing (FDD) mode (or simply FDD system), transmission directions of subframes of a frequency band in the LTE/LTE-A system operating in a time-division duplexing (TDD) mode (or simply TDD system) may be different. That is, the subframes in the same frequency band are divided into UL subframes, downlink (DL) subframes and special subframes according to the UL/DL configuration specified in the 3GPP standard.

FIG. 1 is a table 102 of the UL/DL configurations with subframes and corresponding directions. In FIG. 1, 7 UL/DL configurations are shown, wherein each of the UL/DL configurations indicates a set of transmission directions (hereinafter, directions, for short) for 10 subframes of a radio frame, respectively. Each subframe is indicated by a corresponding subframe number (i.e., subframe index) in FIG. 1. In detail, "U" represents that the subframe is a UL subframe where UL data is transmitted, and "D" represents that the subframe is a DL subframe where DL data is transmitted. "S" represents that the subframe is a special subframe where control information and maybe data (according to the special subframe configuration) is transmitted, and the special subframe can also be seen as the DL subframe in the prior art. Note that the eNB may configure a UL/DL configuration to a UE via a higher layer signaling (e.g., System Information Block Type 1 (SIB1)) or a physical layer signaling (e.g., DL control information (DCI)). In other words, the UE may receive the UL/DL configuration in the SIB1 from a broadcast control channel (BCCH), or in the DCI message from a physical DL control channel (PDCCH) or an enhanced PDCCH (EPDCCH). The UE performs transmission in a subframe in a radio frame if the subframe is a UL subframe indicated in the UL/DL configuration. The UE performs reception in a subframe in a radio frame if the subframe is a DL subframe or a special subframe indicated in the UL/DL configuration.

An information element MeasSubframePattern is defined in the 3GPP standard to specify a subframe pattern indicating subframes where the UE should perform measurements for channel quality reporting (CQI) reporting or Reference Signal Received Power (RSRP) reporting, or indicating subframes where an EPDCCH may be transmitted. The MeasSubframePattern can be set to one of subframeConfig1-5-r10 (corresponding to UL/DL configurations 1-5), subframeConfig0-r1 (corresponding to a UL/DL configuration 0) and subframeConfig6-r10 (corresponding to a UL/DL configuration 6). The subframeConfig1-5-r10 is a 20-bit bitmap, the subframeConfig0-r10 is a 70-bit bitmap, and subframeConfig6-r10 is a 60-bit bitmap.

An eNB may configure the subframeConfig0-r10 to a UE via transmitting a radio resource control (RRC) signaling (e.g., RRCConnectionReconfiguration), and the eNB may broadcast SystemInformationBlockType1 to indicate UL/DL configuration 0 to the UE. The UE performs transmission and reception in a radio frame according to the UL/DL configuration 0. In certain situations, the eNB may configure the UL/DL configuration 1 to the UE according to rapid changes of traffic loads on the UL and the DL (e.g., enhanced interference management & traffic adaptation (EIMTA)). The UE performs transmission and reception according to the UL/DL configuration 1 in a radio frame after receiving the UL/DL configuration 1. Accordingly, the UE does not know how to operate according to the MeasSubframePattern, if the MeasSubframePattern includes a subframeConfig corresponding to a UL/DL configuration (e.g., 0) which is different from the UL/DL configuration (e.g., 1) the UE is currently configured, e.g., by SIB1, a PDCCH or an EPDCCH.

In another example, the UL/DL configuration 1 is configured to a UE (e.g., via SIB1), and a subframeConfig1-5-r10 is configured to a UE by using a RRC signaling for an EPDCCH configuration. The subframeConfig1-5-r10 is a 20-bit bitmap which includes at least one bit set to "1", and all the at least one bit corresponds to at least one DL subframe indicated in the UL/DL configuration 1. Therefore, the UE monitors the EPDCCH in subframes configured according to the subframeConfig1-5-r10. In certain situations, the eNB may configure the UL/DL configuration 4 to the UE by using a PDCCH or an EPDCCH due to rapid changes of traffic loads on the UL and the DL (e.g., EIMTA). Some UL subframes in the UL/DL configuration 1 are changed to DL subframes in UL/DL configuration 4. However, the eNB cannot transmit the EPDCCH to the UE via these DL subframes, because these DL subframes will not be used by the UE for the EPDCCH monitoring according to the subframeConfig1-5-r10. Therefore, flexibility of the scheduling is restricted.

Therefore, the inconsistency between the MeasSubframe-Pattern and the UL/DL configuration configured to the UE is an important problem to be solved.

SUMMARY OF THE INVENTION

The present invention therefore provides a method and related communication device for handling a measurement pattern for a TDD system to solve the abovementioned problem.

A method of handling a measurement pattern for a communication device comprises receiving a subframe pattern from a network; receiving an uplink/downlink (UL/DL) configuration from the network; and performing a communication operation in a subframe according to the subframe pattern and the UL/DL configuration; wherein the subframe pattern is applied to a plurality of UL/DL configurations, and the UL/DL configuration is one of the plurality of UL/DL configurations.

A method of handling a measurement pattern for a communication device comprises receiving a plurality of subframe patterns from a network; selecting a subframe pattern from the plurality of subframe patterns according to an uplink/downlink (UL/DL) configuration configured to the communication device; and performing a communication operation according to the subframe pattern.

A method of handling a measurement pattern for a communication device comprises receiving a subframe pattern from a network; determining whether the subframe pattern corresponds to a an uplink/downlink (UL/DL) configuration configured to the communication device; and stopping applying the subframe pattern, if the communication device determines that the subframe pattern does not correspond to the UL/DL configuration.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of the UL/DL configurations with subframes and corresponding directions.

DETAILED DESCRIPTION

Figure 2:
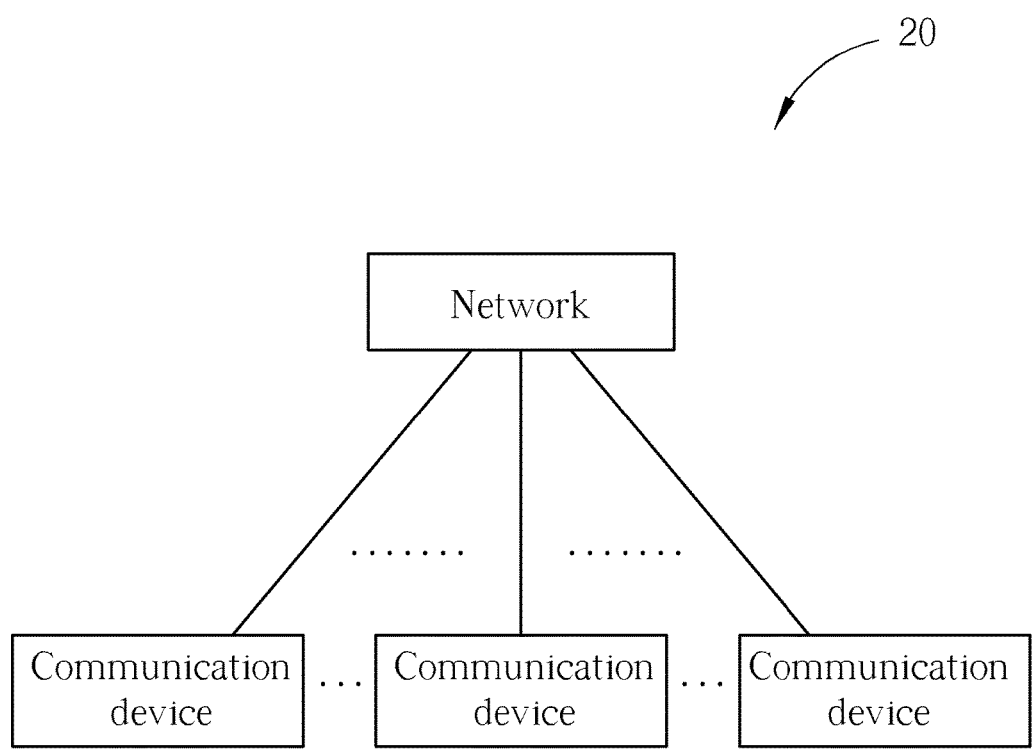
FIG. 2 is a schematic diagram of a wireless communication system according to an example of the present invention.

FIG. 2 is a schematic diagram of a wireless communication system 20 according to an example of the present invention. The wireless communication system 20 is briefly composed of a network and a plurality of communication devices. The wireless communication system 20 supports a time-division duplexing (TDD) mode (i.e., TDD system). That is, the network and a communication device may communicate with each other by using uplink (UL) subframes and downlink (DL) subframes according to one or more UL/DL configurations.

In FIG. 2, the network and the communication devices are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network. A communication device can be a user equipment (UE), a half-duplex UE, a mobile phone, a laptop, a tablet computer, an electronic book or a portable computer system but is not limited. In addition, the network and the communication device can be seen as a transmitter or a receiver according to direction, e.g., for a UL, the communication device is the transmitter and the network is the receiver, and for a DL, the network is the transmitter and the communication device is the receiver. More specifically, for the network, the direction of the transmission is DL, and the direction of the reception is UL. For the communication device, the direction of the transmission is UL, and the direction of the reception is DL.

Figure 3:
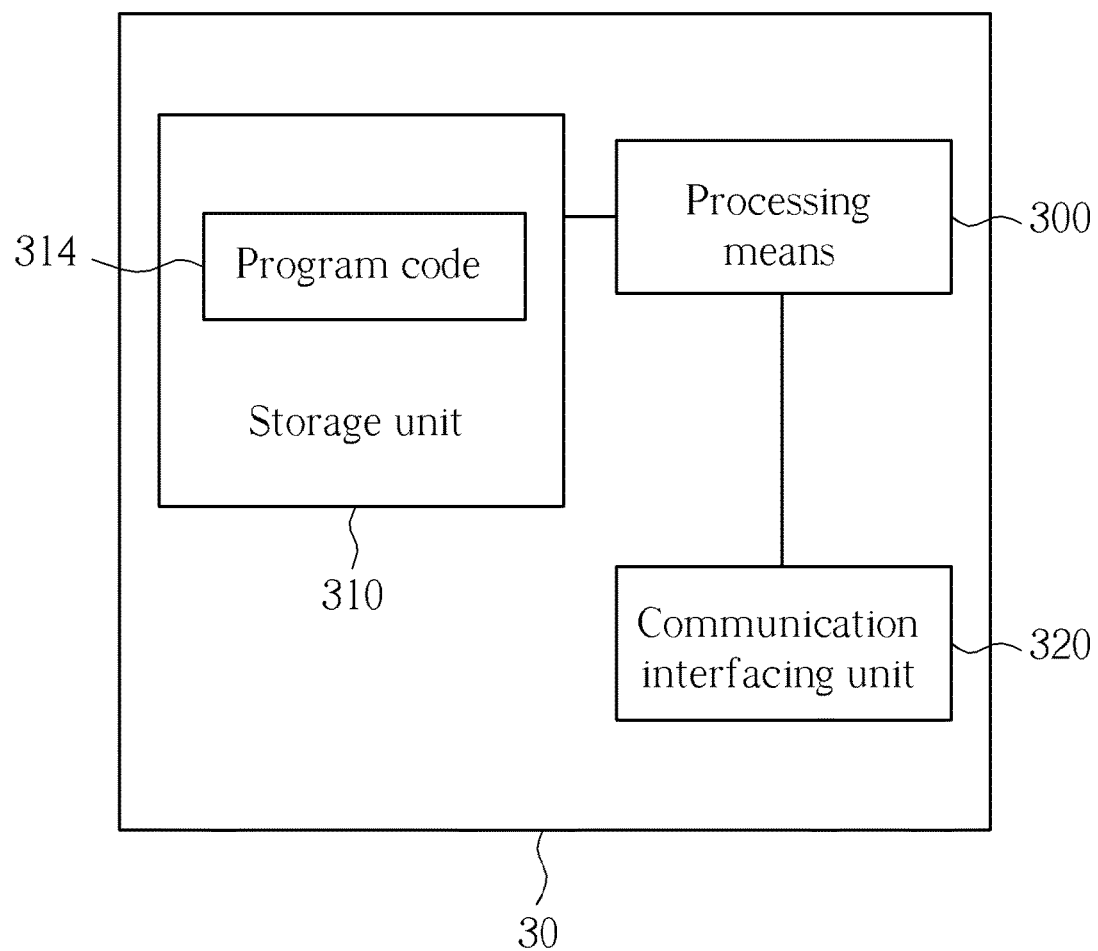
FIG. 3 is a schematic diagram of a communication device according to an example of the present invention.

FIG. 3 is a schematic diagram of a communication device 30 according to an example of the present invention. The communication device 30 can be a communication device or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
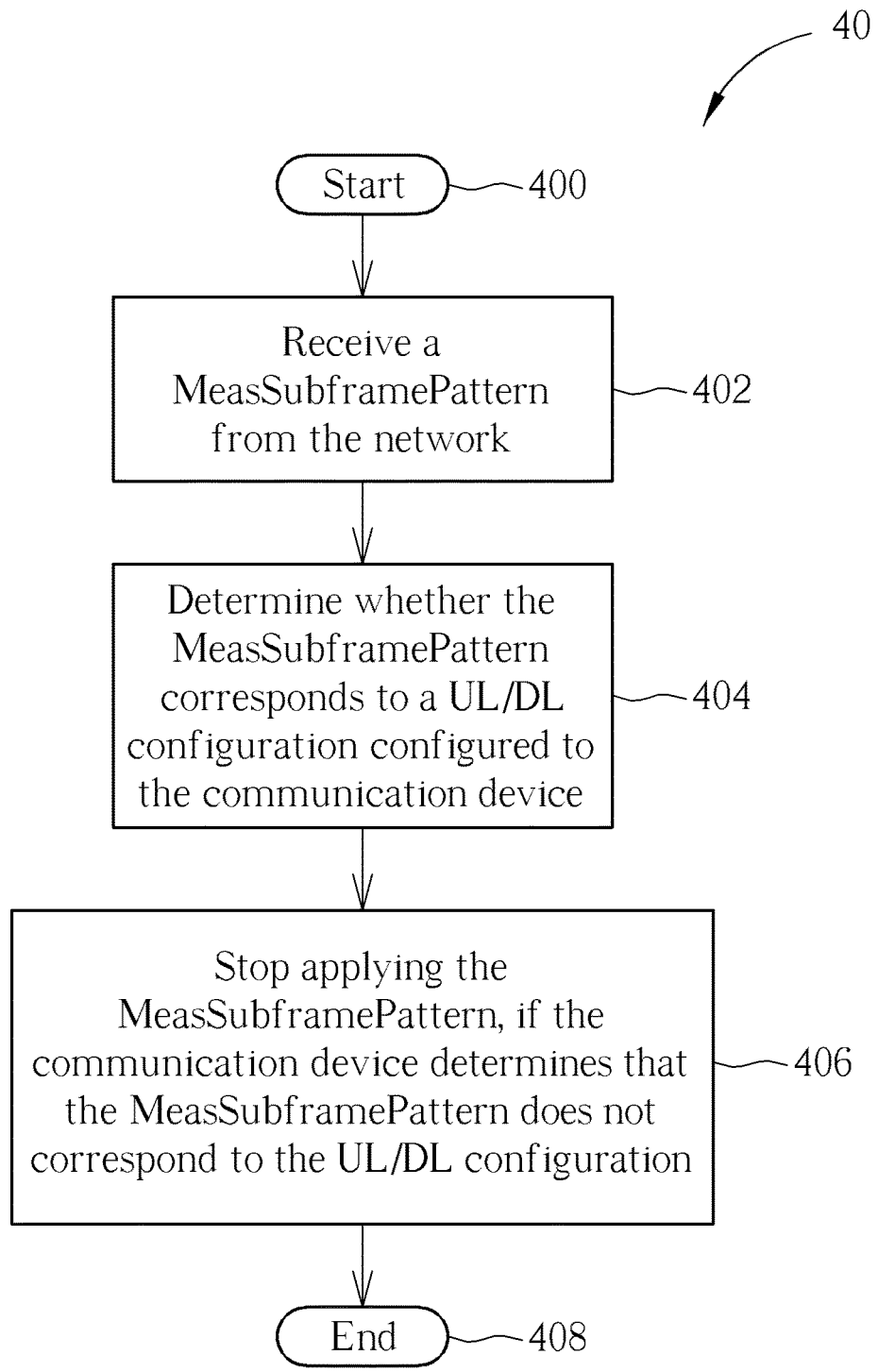
FIG. 4 is a flowchart of a process according to an example of the present invention.

FIG. 4 is a flowchart of a process 40 according to an example of the present invention. The process 40 can be utilized in a communication device shown in FIG. 2, for handling a measurement pattern. The process 40 may be compiled into the program code 314 and includes the following steps:

Step 400: Start.

Step 402: Receive a MeasSubframePattern from the network.

Step 404: Determine whether the MeasSubframePattern corresponds to a UL/DL configuration configured to the communication device.

Step 406: Stop applying the MeasSubframePattern, if the communication device determines that the MeasSubframePattern does not correspond to the UL/DL configuration.

Step 408: End.

According to the process 40, the communication device receives a MeasSubframePattern from the network. Then, the communication device determines whether the MeasSubframePattern corresponds to a UL/DL configuration configured to the communication device. The communication device stops applying the MeasSubframePattern, if the communication device determines that the MeasSubframePattern does not correspond to the UL/DL configuration configured to the communication device. In other words, the communication device does not follow the MeasSubframePattern to perform a communication operation. The communication operation may include a measurement and/or a decoding of an enhanced physical DL control channel (EPDCCH) in a subframe. That is, the communication device does not apply the MeasSubframePattern, if the MeasSubframePattern and the UL/DL configuration are not consistent. The MeasSubframePattern may include a subframeconfig1-5-r10, a subframeconfig0-r10, or a subframeconfig6-r10. The subframeConfig1-5-r10, the subframeConfig0-r10 and the subframeConfig6-r10 correspond to UL/DL configurations 1-5, a UL/DL configuration 0 and a UL/DL configuration 6, respectively, and are bitmaps with sizes of 20 bits, 70 bits and 60 bits, respectively. Thus, the MeasSubframePattern and the UL/DL configuration are not consistent, if the MeasSubframePattern includes a subframeconfig1-5r1 and the UL/DL configuration is 6. Thus, the communication device will not perform a wrong communication operation. As a result, an inaccurate measurement result will not be obtained and/or unnecessary EPDCCH decoding will be avoided, when the communication device performs the measurement according to the MeasSubframePattern. The inaccurate measurement result may occur, when the communication device measures a subframe corresponding to a bit set to "1" in the MeasSubframePattern but the subframe is a UL subframe according to the UL/DL configuration configured to the communication device. The unnecessary EPDCCH decoding may occur, when the communication device receives and decodes an EPDCCH in a subframe corresponding to a bit set to "1" in the MeasSubframePattern but the subframe is a UL subframe indicated in the UL/DL configuration configured to the communication device. Power consumption can be reduced and unnecessary decoding can be avoided, when the communication decodes the EPDCCH according to the MeasSubframePattern.

Realization of the process 40 is not limited to the above description.

The communication device may receive the MeasSubframePattern in a subframePatternConfig-r11, a csi-SubframePatternConfig-r10 or a MeasSubframePatternPCell-r10. For example, the communication device may decode the EPDCCH according to the MeasSubframePattern, when the MeasSubframePattern is received in the subframePatternConfig-r11. In another example, the communication device may perform measurements in subframes for RSRP, Reference Signal Received Quality (RSRQ) and/or radio link monitoring according to the MeasSubframePattern, when the MeasSubframePattern is received in the MeasSubframePatternPCell-r10. In another example, the communication device may perform measurements for channel state information (CSI) reporting in subframes indicated in the MeasSubframePattern, when the MeasSubframePattern is received in the csi-SubframePatternConfig-r10. The CSI may include a channel quality indication (CQI).

The communication device may perform the communication operation according to the MeasSubframePattern, if the MeasSubframePattern corresponds to the UL/DL configuration configured to the communication device. For example, the MeasSubframePattern and the UL/DL configuration are consistent, if the MeasSubframePattern includes a subframeconfig1-5-r10 and the UL/DL configuration is 2. Thus, the communication device can operate regularly according to the above description.

Figure 5:
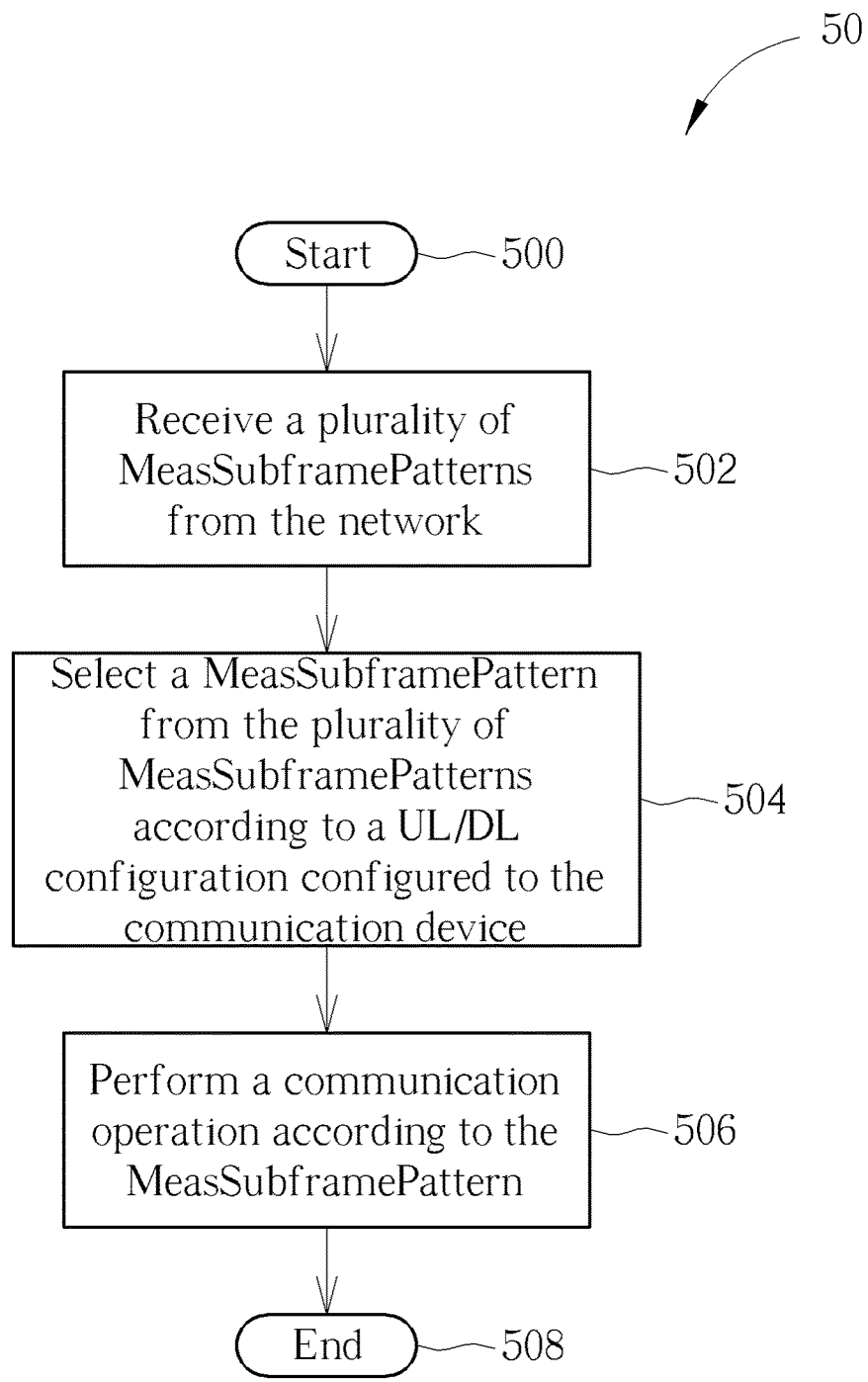
FIG. 5 is a flowchart of a process according to an example of the present invention.

FIG. 5 is a flowchart of a process 50 according to an example of the present invention. The process 50 can be utilized in a communication device shown in FIG. 2, for handling a measurement pattern. The process 50 may be compiled into the program code 314 and includes the following steps:

Step 500: Start.

Step 502: Receive a plurality of MeasSubframePatterns from the network.

Step 504: Select a MeasSubframePattern from the plurality of MeasSubframePatterns according to a UL/DL configuration configured to the communication device.

Step 506: Perform a communication operation according to the MeasSubframePattern.

Step 508: End.

According to the process 50, the communication device receives a plurality of MeasSubframePatterns from the network. Then, the communication device selects a MeasSubframePattern from the plurality of MeasSubframePatterns according to a UL/DL configuration configured to the communication device, and performs a communication operation according to the MeasSubframePattern. The communication operation may include a measurement or a decoding of an EPDCCH. That is, the communication device selects a proper MeasSubframePattern for performing the communication operation, to solve a possible inconsistency between the MeasSubframePattern and the UL/DL configuration. The plurality of MeasSubframePatterns may include a set of a subframeconfig1-5-r10, a subframeconfig0-r10 and a subframeconfig6-r10. The subframeConfig1-5-r10, the subframeConfig0-r10 and the subframeConfig6-r10 correspond to UL/DL configurations 1-5, a UL/DL configuration 0 and a UL/DL configuration 6, respectively, and are bitmaps with sizes of 20 bits, 70 bits and 60 bits, respectively. Thus, the communication device will not perform an improper communication operation. As a result, an inaccurate measurement result will not be obtained, when the communication device performs the measurement according to the MeasSubframePattern. Power consumption can be reduced and unnecessary decoding can be avoided, when the communication decodes the EPDCCH according to the MeasSubframePattern.

Realization of the process 50 is not limited to the above description.

For example, the communication device may receive a plurality of MeasSubframePatterns, where each MeasSubframePattern corresponds to a UL/DL configuration and indicates subframes where the communication device needs to decode an EPDCCH. The communication device selects a MeasSubframePattern from the plurality of MeasSubframePatterns and the selected MeasSubframePattern corresponds to a UL/DL configuration being used by the communication device. The communication device decodes the EPDCCH in the subframes indicated in the selected MeasSubframePattern. In another example, the communication device may receive a plurality of MeasSubframePatterns, where each MeasSubframePattern corresponds to a UL/DL configuration and indicates subframes where the communication device needs to perform measurements for RSRP reporting, RSRQ reporting and/or radio link monitoring. The communication device selects a MeasSubframePattern from the plurality of MeasSubframePatterns and the selected MeasSubframePattern corresponds to a UL/DL configuration being used by the communication device. The communication device performs the measurements in the subframes indicated in the selected MeasSubframePattern. In another example, the communication device may receive a plurality of MeasSubframePatterns where each MeasSubframePattern corresponds to a UL/DL configuration and indicates subframes where the communication device needs to perform measurements for CSI reporting. The communication device selects a MeasSubframePattern from the plurality of MeasSubframePatterns and the selected MeasSubframePattern corresponds to a UL/DL configuration being used by the communication device. The communication device performs the measurements for the CSI reporting in the subframes indicated in the selected MeasSubframePattern. The CSI may include a CQI. The plurality of MeasSubframePatterns may be included in a new information element defined by 3GPP.

The communication device may select the MeasSubframePattern, if the MeasSubframePattern corresponds to the UL/DL configuration. For example, the plurality of MeasSubframePatterns may include the subframeconfig0-r10 and the subframeconfig6-r10. The communication device may select the subframeconfig6-r10 for performing the communication operation, if the UL/DL configuration is 6. Thus, the communication device can operate regularly according to the above description.

Figure 6:
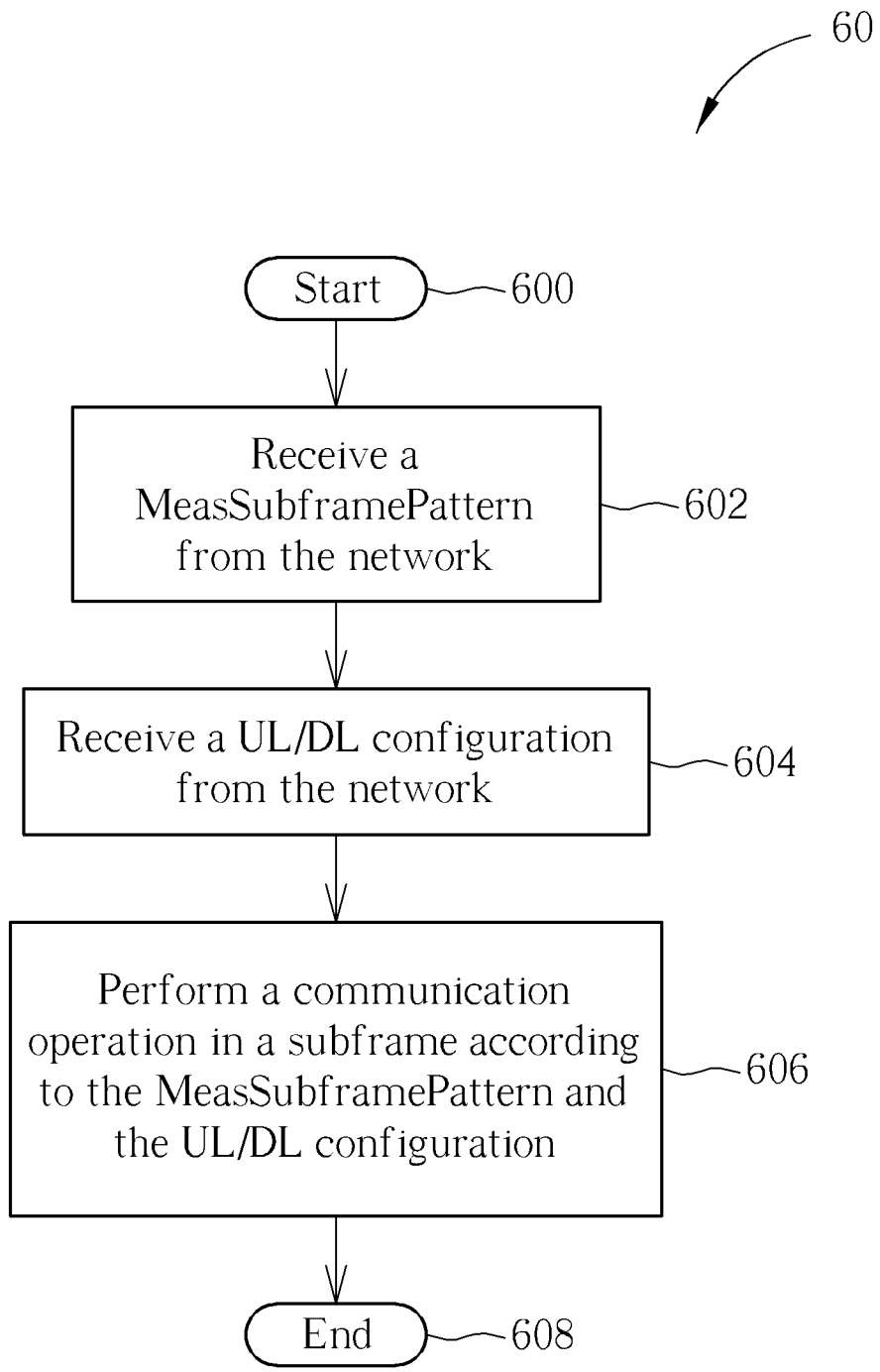
FIG. 6 is a flowchart of a process according to an example of the present invention.

FIG. 6 is a flowchart of a process 60 according to an example of the present invention. The process 60 can be utilized in a communication device shown in FIG. 2, for handling a measurement pattern. The process 60 may be compiled into the program code 314 and includes the following steps:

Step 600: Start.

Step 602: Receive a MeasSubframePattern from the network.

Step 604: Receive a UL/DL configuration from the network.

Step 606: Perform a communication operation in a subframe according to the MeasSubframePattern and the UL/DL configuration.

Step 608: End.

According to the process 60, the communication device receives a MeasSubframePattern from the network, and receives a UL/DL configuration from the network. Then, the communication device performs a communication operation in a subframe according to the MeasSubframePattern and the UL/DL configuration. The MeasSubframePattern is applied to a plurality of UL/DL configurations, and the UL/DL configuration is one of the plurality of UL/DL configurations. That is, the MeasSubframePattern can be applied to multiple UL/DL configurations. The network may configure the UL/DL configuration to the communication device by transmitting a higher layer signaling (e.g., radio resource control (RRC) signaling) or a physical layer signaling. The communication operation may include a measurement and/or a decoding of an EPDCCH. That is, the communication device performs the communication operation in the subframe indicated in the MeasSubframePattern, and the subframe is a DL subframe indicated in the UL/DL configuration configured to the communication device. Hence, the MeasSubframePattern is valid no matter which one of the UL/DL configurations is applied. Thus, the communication device will not perform a measurement in a subframe indicated in the MeasSubframePattern, but the subframe is an UL subframe indicated in the UL/DL configuration. As a result, an inaccurate measurement result will not be obtained, when the communication device performs the measurement according to the MeasSubframePattern and the UL/DL configuration configured to the communication device. Power consumption can be reduced and unnecessary decoding can be avoided, when the communication decodes the EPDCCH according to the MeasSubframePattern and the UL/DL configuration configured to the communication device.

The network may transmit a UL/DL configuration in system information, a RRC message or a physical layer signaling (e.g., DCI on a PDCCH or an EPDCCH), to the communication device. The MeasSubframePattern may include a subframeconfig1-5-r10, a subframeconfig0-r10, or a subframeconfig6-r10. The subframeConfig1-5-r10, the subframeConfig0-r10 and the subframeConfig6-r10 correspond to UL/DL configurations 1-5, a UL/DL configuration 0 and a UL/DL configuration 6, respectively, and are bitmaps with sizes of 20 bits, 70 bits and 60 bits, respectively. Alternatively, the MeasSubframePattern maybe a newly defined bitmap with a number of bits (e.g., 10 bits) different from 20 bits, 70 bits and 60 bits. The new bitmap may be defined as a new information element with a name different from "MeasSubframePattern". The new MeasSubframePattern may be applied to a plurality of UL/DL configurations. The new MeasSubframePattern may be applied to all UL/DL configurations defined in 3GPP standard. The MeasSubframePattern may indicate subframes where the communication device needs to perform measurements for RSRP reporting, RSRQ reporting and/or radio link monitoring. The MeasSubframePattern may indicate subframes where the communication device needs to perform measurements for CSI reporting. The MeasSubframePattern may indicate subframes where the communication device needs to decode an EPDCCH.

Realization of the process 60 is not limited to the above description.

The communication device may be configured with a UL/DL configuration by DCI on a PDCCH or an EPDCCH, and may receive a MeasSubframePattern in a subframePatternConfig-r11, a csi-SubframePatternConfig-r10 or a MeasSubframePatternPCell-r10. For example, the communication device may decode the EPDCCH in a subframe indicated in the MeasSubframePattern, when the MeasSubframePattern is received in the subframePatternConfig-r11 and the subframe is a DL subframe indicated in the UL/DL configuration. In another example, the communication device may perform a measurement for RSRP reporting, RSRQ reporting and/or radio link monitoring in a subframe indicated in the MeasSubframePattern, when the MeasSubframePattern is received in the MeasSubframePatternPCell-r10 and the subframe is a DL subframe indicated in the UL/DL configuration. In another example, the communication device may perform a measurement for CSI reporting in a subframe indicated in the MeasSubframePattern, when the MeasSubframePattern is received in the csi-SubframePatternConfig-r10 and the subframe is a DL subframe indicated in the UL/DL configuration.

The communication device may perform the communication operation in a subframe, if the subframe corresponds to a bit "1" in the MeasSubframePattern and is a DL subframe indicated in the UL/DL configuration. The communication device may stop performing the communication operation in a subframe, if the subframe corresponds to a bit "0" in the MeasSubframePattern or is a UL subframe indicated in the UL/DL configuration. Alternatively, the communication device may perform the communication operation in the subframe but discards or ignores a measurement result and/or a decoding result, if the subframe corresponds to a bit "0" in the MeasSubframePattern or is a UL subframe indicated in the UL/DL configuration. In other words, the communication device does not take the measurement result into account, when obtaining (e.g., deriving) RSRP, RSRQ and/or CSI, and/or determining out of synchronization in a physical layer. For example, let the MeasSubframePattern include the subframeConfig1-5-r10, and the UL/DL configuration configured to the communication device is 3. A size of the subframeConfig1-5-r10 is 20 bits, and the subframeConfig1-5-r10 is assumed to be {1011101110, 0001110101}, wherein the first set of bits and the second set of bits can be referred to a first frame and a second frame, respectively. The communication device compares {1011101110, 0001110101} and {DSUUUDDDDD, DSUUUDDDDD} according to the above description and the table 102. Then, the communication device performs the communication operation in the subframes 0 and 6-8 of the first frame and in the subframes 5, 7 and 9 of the second frame, because these subframes correspond to DL subframes. The communication device stops performing the communication operation in the other subframes or performs the communication operation but discards measurement results and/or decoding results, because these subframes are indicated by bits "0" or correspond to UL subframes. Thus, the communication device can operate regularly according to the above description.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SoC), system in package (SiP), a computer on module (CoM), and the communication device 30.

To sum up, the present invention provides a method of handling communication operations for a communication device. Thus, an inaccurate measurement result will not be obtained, when the communication device performs a measurement according to a received MeasSubframePattern. Power consumption can be reduced and unnecessary decoding can be avoided, when the communication decodes an EPDCCH according to the MeasSubframePattern.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a measurement pattern for a communication device, the method comprising:
   receiving a subframe pattern from a network;
   receiving an uplink/downlink (UL/DL) configuration from the network; and
   performing a communication operation in a subframe according to the subframe pattern and the UL/DL configuration, wherein the communication operation comprises at least one measurement for channel state information (CSI) reporting and/or a decoding of an enhanced physical DL control channel (EPDCCH);
   wherein the subframe pattern is applied to a plurality of UL/DL configurations, and the UL/DL configuration is one of the plurality of UL/DL configurations;
   wherein the communication device performs the communication operation in the subframe, if the subframe corresponds to a bit "1" in the subframe pattern and is a DL subframe indicated in the UL/DL configuration.

2. The method of claim 1, wherein the subframe pattern is applied to all UL/DL configurations.

3. The method of claim 1, wherein the communication device stops performing the communication operation in the subframe, if the subframe correspond to a bit "0" in the subframe pattern or is a UL subframe indicated in the UL/DL configuration.

4. A communication device for handling a measurement pattern, comprising:
   a storage unit, for storing instructions of;
   receiving a subframe pattern from a network;
   receiving an uplink/downlink (UL/DL) configuration from the network; and
   performing a communication operation in a subframe according to the subframe pattern and the UL/DL configuration, wherein the communication operation comprises at least one measurement for channel state information (CSI) reporting and/or a decoding of an enhanced physical DL control channel (EPDCCH);
   wherein the subframe pattern is applied to a plurality of UL/DL configurations, and the UL/DL configuration is one of the plurality of UL/DL configurations;
   wherein the communication device performs the communication operation in the subframe, if the subframe corresponds to a bit "1" in the subframe pattern and is a DL subframe indicated in the UL/DL configuration; and
   a processing circuit, coupled to the storage unit, configured to execute the instructions stored in the storage unit.

5. The communication device of claim 1, wherein the subframe pattern is applied to all UL/DL configurations.

6. The communication device of claim 1, wherein the communication device stops performing the communication operation in the subframe, if the subframe correspond to a bit "0" in the subframe pattern or is a UL subframe indicated in the UL/DL configuration.

* * * * *